United States Patent [19]

Pews et al.

[11] 3,875,203

[45] Apr. 1, 1975

[54] ((TRICHLORONITROPHENYL)THIO)ACETONITRILES

[75] Inventors: R. Garth Pews; Christian T. Goralski, both of Midland; George A. Burk, Bay City, all of Mich.

[73] Assignee: The Dow Chemical Co., Midland, Mich.

[22] Filed: July 12, 1973

[21] Appl. No.: 378,461

[52] U.S. Cl. .............................. 260/465 G, 424/304
[51] Int. Cl. ............................................ C07c 121/52
[58] Field of Search .................. 260/465 G; 424/304

[56] References Cited
UNITED STATES PATENTS 3,337,576   8/1967   Buchanan et al. ............... 260/465 G

OTHER PUBLICATIONS

Traverso et al., C.A., 50 (1956), 5634–5635.
Bristol–Myers Co., C.A., 72 (1970), 12731p.

*Primary Examiner*—Joseph P. Brust
*Attorney, Agent, or Firm*—C. Kenneth Bjork; Theodore Post

[57] ABSTRACT ((2,3,6-Trichloro-4-nitrophenyl)thio)acetonitrile, ((2,3,4-trichloro-6-nitrophenyl)thio)acetonitrile and mixtures thereof are prepared by mixing and heating at reflux the corresponding sodium salt of trichloronitrobenzenethiol and chloroacetonitrile in a lower alkanol as reaction medium. The products are useful as antimicrobials, particularly as fungicides.

4 Claims, No Drawings

((TRICHLORONITROPHENYL)THIO)ACETONITRILES

BACKGROUND OF THE INVENTION

No compounds having a close structural relationship to those described and claimed are known.

SUMMARY OF THE INVENTION

This invention concerns the new compounds ((2,3,6-trichloro-4-nitrophenyl)thio)acetonitrile, ((2,3,4-trichloro-6-nitrophenyl)thio)acetonitrile and mixtures thereof. The products when recrystallized from benzene are bright yellow crystalline solids which are soluble in methylene chloride, chloroform and acetone and insoluble in water.

The compounds are prepared by mixing at reflux temperature a corresponding trichloronitrobenzenethiol, advantageously as its sodium salt, and prepared in situ, with a substantially equimolar proportion up to about 20 percent molar excess of chloroacetonitrile in the presence of a lower alkanol such as methanol or ethanol as reaction medium. By-product sodium chloride is filtered off and the solvent is removed in vacuo from the filtrate leaving the crude product as a tan solid. The product may be purified if desired by recrystallization from benzene.

Advantageously, the compounds may be prepared by mixing at reflux temperature a commercial mixture of 2,3,6-trichloro-4-nitrobenzenethiol and 2,3,4-trichloro-6-nitrobenzenethiol as their sodium salts with a substantially equimolar proportion up to a 20% excess of chloroacetonitrile in the presence of a lower alkanol as reaction medium. The resulting mixture of isomers of ((2,3,6-trichloro-4-nitrophenyl)thio)acetonitrile and ((2,3,4-trichloro-6-nitrophenyl)thio)acetonitrile is separated into its components by a chromatographic method. However, since both isomers have substantially equimolar fungicidal activity, as would be expected, the commercial mixture as formed is useful as such.

DESCRIPTION OF THE PREFERRED EMBODIMENTS

The following example additionally describes a specific embodiment and the best mode contemplated by the inventors of carrying out the invention.

EXAMPLE ((2,3,6-Trichloro-4-nitrophenyl)thio)acetonitrile and ((2,3,4-Trichloro-6-nitrophenyl)thio)acetonitrile To 6.4 g. (0.025 mol) of a mixture of 2,3,6-trichloro-4-nitrobenzenethiol and 2,3,4-trichloro-6-nitrobenzenethiol in 150 ml. of ethanol was added 1.5 g. of sodium methoxide. To this solution, 2.2 g. (0.029 mol) of chloroacetonitrile was added, and the reaction mixture was heated with stirring at reflux for one hour. The reaction mixture was cooled and filtered and the ethanol removed in vacuo from the filtrate, leaving a tan solid. The crude product was recrystallized from benzene to give 4.1 g. (51 percent yield) of a mixture of the title compounds, m.p. 83°–84°C.

Anal. Calcd. for $C_8H_3Cl_3N_2O_2S$: C, 32.2; H, 1.0; Cl, 35.8; N, 9.4; S, 10.8.

Found: C, 32.7; H, 1.2; Cl, 36.0; N, 9.2; S, 11.7. The individual isomers are separated by a chromatographic method.

The compounds of the invention are useful as antimicrobials, primarily for the control of fungi. This is not to suggest that the compounds of this invention and their mixtures are equally effective against all such organisms at the same concentration. For such uses the compounds or their isomeric mixtures can be employed in an unmodified form or dispersed on a finely divided solid and employed as dusts. Such mixtures can also be dispersed in water with the aid of a surface-active agent and the resulting emulsions employed as sprays. In other procedures, the products can be employed as active constituents in solvent solutions, oil-in-water or water-in-oil emulsions. The augmented compositions are adapted to be formulated as concentrates and subsequently diluted with additional liquid or solid adjuvants to produce the ultimate treating compositions. Good results are obtained when employing compositions containing fungicidal concentrations and usually from about 100 to about 1,000 parts by weight of one or more of the compounds per million parts of such compositions.

Incorporation of the compounds of this invention into materials which are subject to fungal attack inhibits the growth of the fungi and preserves the original value of the materials. The compounds are sufficiently non-volatile and water-insoluble that they will persist on or in such materials for long periods of time. Examples of materials which are adversely affected by fungal growth are latex and alkyd paint films, wood and wooden products. The inventive compounds are sufficiently active against fungi that only small quantities are required to prevent mildew on paint films or wood rot. The compounds are therefore useful for long-term protection against fungal growth in or on materials having a wood basis or a protective or decorative paint film subject to fungal attack.

In representative operations, the products of the Example when tested for antimicrobial activity using conventional agar dilution tests gave complete growth inhibition against Staphylococcus aureus, Bacillus subtilis, Candida albicans, Trichophyton mentagrophytes, Aspergillus terreus, Candida pelliculosa, Pullularia pullulans, Mycobacterium phlei, Rhizopus nigricans, Ceratocystis ips, Cephaloascus fragans and Trichoderm Species Madison P-42 at a concentration of 100 parts per million.

What is claimed is:

1. ((2,3,6-Trichloro-4-nitrophenyl)thio)acetonitrile, ((2,3,4-trichloro-6-nitrophenyl)thio)acetonitrile and mixtures thereof.

2. The product of claim 1 which is ((2,3,6-trichloro-4-nitrophenyl)thio)acetonitrile.

3. The product of claim 1 which is ((2,3,4-trichloro-6-nitrophenyl)thio)acetonitrile.

4. The product of claim 1 which is an isomeric mixture of ((2,3,6-trichloro-4-nitrophenyl)thio)acetonitrile and ((2,3,4-trichloro-6-nitrophenyl)thio)acetonitrile.

* * * * *